United States Patent [19]
Maruyama et al.

[11] Patent Number: 4,768,946
[45] Date of Patent: Sep. 6, 1988

[54] MOLD CLAMPING DEVICE FOR MOLDING MACHINES

[75] Inventors: Yoshio Maruyama, Kyoto; Kazuei Kenmochi, Osaka, both of Japan

[73] Assignee: Matsushita Electric Industrial Co., Ltd., Osaka, Japan

[21] Appl. No.: 860,624

[22] Filed: May 6, 1986

[30] Foreign Application Priority Data

May 8, 1985 [JP] Japan .................................. 60-98746

[51] Int. Cl.⁴ ..................... B29C 33/20; B29C 45/03
[52] U.S. Cl. .................................. 425/595; 100/291;
164/303; 164/341; 164/342; 164/343;
425/451.7
[58] Field of Search .............. 425/451, 451.2, 451.4,
425/451.7, 451.6, 451.5, 589, 592, 593, 595, 150;
100/291, 292; 72/452; 164/303, 339, 342, 343,
341

[56] References Cited

U.S. PATENT DOCUMENTS

| | | | |
|---|---|---|---|
| 250,699 | 12/1881 | Wilson | 100/292 |
| 608,937 | 8/1898 | Wallace | 100/292 |
| 2,115,590 | 4/1938 | Ryder | 425/595 |
| 2,122,316 | 6/1938 | Ganio | 100/292 |
| 3,122,033 | 2/1964 | Riemenschneider et al. | 100/291 |
| 3,580,794 | 5/1971 | Mintz | 100/291 |
| 3,743,469 | 7/1973 | Gibbons | 425/451.7 |
| 3,883,286 | 5/1975 | Kinslow et al. | 425/451 |

FOREIGN PATENT DOCUMENTS 594831 6/1950 Italy .................................. 100/292
56-102033 1/1981 Japan .

Primary Examiner—Willard E. Hoag
Attorney, Agent, or Firm—Lowe, Price, LeBlanc, Becker & Shur

[57] ABSTRACT

A mold clamping device includes a frame, a fixed base for supporting a first mold, the fixed base being fixedly mounted on the frame, a movable base for supporting a second mold, the movable base being movably mounted on the frame in confronting relation to the fixed base, first means on the frame for driving the movable base to move rectilinearly toward and away from the fixed base, a cam follower supported on the movable base, a cam supported on the frame and having a cam surface held in contact with the cam follower, and second means for driving the cam in a mold clamping stroke to displace the cam follower for enabling the movable base to clamp the second mold firmly against the first mold on the fixed base, the cam surface being defined by a cam follower displacement curve having a gradient which is greater at an initial stage of the mold clamping stroke and becomes smaller as the mold clamping stroke progresses. When the cam is driven by the second means, the cam follower is displaced thereby to clamp the first and second molds together. The cam is small in size to make the mold clamping device small in size, and is high in rigidity to allow itself to be driven by a small force.

18 Claims, 3 Drawing Sheets

MOLD CLAMPING DEVICE FOR MOLDING MACHINES

BACKGROUND OF THE INVENTION

The present invention relates to a mold clamping device in a molding device for producing molded pieces of plastic or die-cast pieces of metal.

In the field of molding machines, there exists a need for a mold clamping device of a small size and of low power requirements in to reduce the installation space and cut down the cost of energy consumed.

One conventional mold clamping device for a molding machine is illustrated in FIG. 5 of the accompanying drawings. The mold clamping device includes a guide 1, a fixed base 2, and a movable base 3 guided by the guide 1 so as to be vertically movable rectilinearly toward and away from the fixed base 2, the guide 1 and the fixed and movable bases 2, 3 being supported on a frame 4. The fixed and movable bases 2, 3 support upper and lower molds 7, 8, respectively. A toggle mechanism 5 operatively coupled between the lower base 3 and the frame 4 is driven by an actuator 6 such as a hydraulic or pneumatic cylinder 6 mounted on the frame 4.

In operation, the toggle mechanism 5 is extended by the actuator 6 to move the movable base 3 upwardly along the guide 1 until the lower mold 8 is brought into contact with the upper mold 7. As the toggle mechanism 5 is further extended, the upper and lower molds 7, 8 are clamped together under high pressure while the mold clamping mechanism including the frame 4 and the toggle mechanism 5 are being slightly deformed elastically. When the actuator 6 is operated to retract its piston rod, the toggle mechanism 5 starts to collapse to allow the upper and lower molds 7, 8 to be unclamped. Continued operation of the actuator 6 causes the toggle mechanism 5 to be folded, lowering the lower mold 8 away from the upper mold 7.

The illustrated mold clamping device is however disadvantageous for the following reasons:

(1) As the included angle between the two arms of the toggle mechanism 5 is reduced, the force with which the toggle mechanism 5 raises or lowers the movable base 3 is also reduced at a rapid rate. Since the included angle cannot therefore be smaller than a certain angle, the toggle mechanism 5 is required to be relatively tall.

(2) The rigidity of the mold clamp mechanism is reduced when the shafts of the toggle mechanism 5 are flexed and the bearing surfaces of the toggle mechanism 5 are deformed. Large forces are consequently required to drive the toggle mechanism 5.

(3) The mold clamping device consumes a large amount of energy since only the single actuator 6 is employed to carry out both the process of closing the molds 7, 8 and the process of clamping the molds 7, 8 under high pressure, these two processes imposing different loads on the actuator 6.

Another conventional mold clamping device for a molding machine will be described with reference to FIG. 6. The mold clamping device shown in FIG. 6 is disclosed in Japanese Laid-Open Utility Model Publication No. 56(1981)-102023. The molding machine includes a mold assembly 101 which is connected to a pair of power blocks 102 that are reciprocally movable rectilinearly in unison by a pair of slide blocks 103, respectively, that are in turn reciprocally movable rectilinearly in a direction normal to the direction of movement of the power blocks 102. The slide blocks 103 are driven by a pair of hydraulic cylinders 104, respectively.

The mold clamping device operates as follows: After the mold assembly 101 is closed, the slide blocks 103 are pulled in the direction of the arrow A by the hydraulic cylinders 104. Slanted surfaces 105 of the power blocks 102 are engaged by slanted surfaces 106 of the slide blocks 103, whereupon the mold clamp mechanism including the power and slide blocks 102, 103 are slightly deformed elastically to clamp the mold assembly 101 under a clamping force. The problems with the prior mold clamping device are that the hydraulic cylinder 104 should be large in size in proportion to the mold clamping force required, and the loss of energy is large since the mold clamping device is required to produce a force greater than the sum of a force applied to clamp the mold assembly 101 and a force applied to overcome the friction between the power and slide blocks 102, 103, but only a small force is required at an initial stage of the mold clamping cycle.

SUMMARY OF THE INVENTION

It is an object of the present invention to provide a mold clamping device for molding machines which has a small-size mold clamping member, is capable of producing a required mold clamping force with a small driving force, and consumes a small amount of energy for operation.

According to the present invention, a mold clamping device includes a frame, a fixed base for supporting a first mold, the fixed base being fixedly mounted on the frame, a movable base for supporting a second mold, the movable base being movably mounted on the frame in confronting relation to the fixed base, first means on the frame for driving the movable base to move rectilinearly toward and away from the fixed base, a cam follower supported on the movable base, a cam supported on the frame and having a cam surface held in contact with the cam follower, and second means for driving the cam in a mold clamping stroke to displace the cam follower for enabling the movable base to clamp the second mold firmly against the first mold on the fixed base, the cam surface being defined by a cam follower displacement curve having a gradient which is greater at an initial stage of the mold clamping stroke and becomes smaller as the mold clamping stroke progresses.

With this arrangement, the second means for driving the movable base to clamp the first and second molds under high pressure may be of a small size, and hence the entire mold clamp mechanism may be reduced in size. The cam may easily be designed for a higher degree of rigidity, so that the mold clamp mechanism can be of higher rigidity. The first and second means are employed respectively for the process of opening and closing the molds and the process of clamping the molds, these processes imposing different loads on the first and second means. Since the cam surface can appropriately be selected to meet load variations in the process of clamping the molds under high pressure and also to meet variations in the power output of the second means, the loss of energy can be minimized.

BRIEF DESCRIPTION OF THE DRAWINGS

The present invention will be described in detail by way of illustrative example with reference to the accompanying drawings, in which.

DETAILED DESCRIPTION

Figure 1:
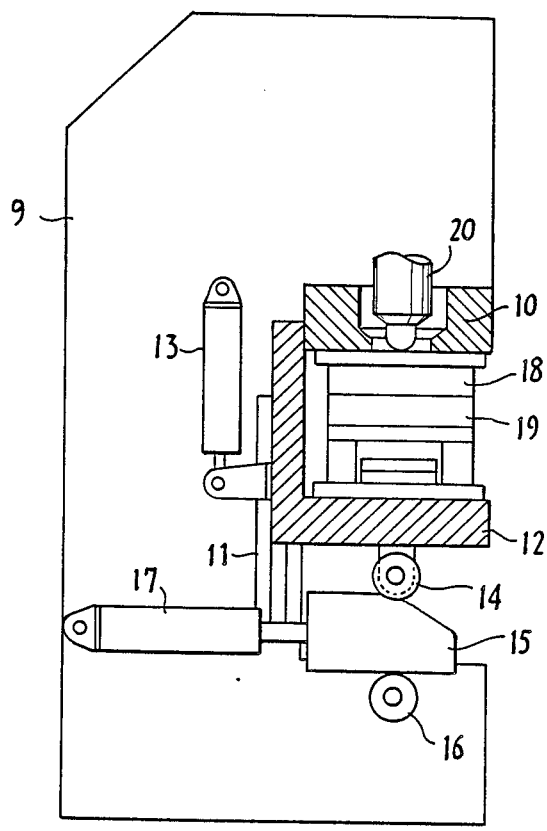
FIG. 1 is a side elevational view, partly in cross section, of a mold clamping device according to an embodiment of the present invention.

As shown in FIG. 1, a mold clamping device for a molding machine or a die-casting machine according to an embodiment of the present invention includes a frame 9, a fixed base 10 fixedly mounted on the frame 9, a guide 11 vertically mounted on the frame 9, a movable base 12 guided by the guide 11 to move vertically toward and away from the fixed base 10, an actuator 13 such as an air cylinder mounted on the frame 9 for driving the movable base 12, a cam follower 14 comprising a roller rotatably mounted on the movable base 12, a cam 15 movably supported on a roller 16 rotatably mounted on the frame 9 and held in rolling engagement with the lower surface of the cam 15, and an actuator 17 such as an air cylinder mounted on the frame 9 for driving the cam 15. A fixed mold 18 is mounted or the lower surface of the fixed base 10, and a movable mold 19 is mounted on the upper surface of the movable base 12 in confronting relation to the fixed mold 10. An injection nozzle 20 is mounted in the fixed base 10 for injecting a mass of molten plastics or metal into a mold assembly which is completed by the fixed and movable molds 18, 19 put together. The frame 9 and the cam 15 jointly constitute a mold clamp mechanism (described later).

Operation of the mold clamping device will be described below. When the air cylinder 13 is operated to retract its piston rod, the movable base 12 is guided by the guide 11 to move upwardly into contact with the fixed mold 18. After the fixed and movable molds 18, 19 are held against each other, the air cylinder 17 is actuated to extend its piston rod to translate the cam 15, lifting the roller 14. Since the molds 18, 19 are already in contact with each other, the mold clamp mechanism is slightly deformed elastically to clamp the molds 18, 19 firmly together under high pressure. Molten plastic or metal is then injected from the injection nozzle 20 into the clamped mold assembly. Thereafter, the air cylinder 17 retracts the piston rod to lower cam 15. The mold clamp mechanism is released to unclamp the molds 18, 19. Then, the air cylinder 13 is operated to extend the piston rod in order to lower the movable mold 19 away from the fixed mold 18.

The cam 15 has a cam surface defined by a cam follower displacement curve including a portion expressed by the following equation (1):

$$\frac{dZ}{dx} = \frac{F}{KZ} - A \tag{1}$$

where
Z: the displacement of the cam;
F: the force required to drive the cam;
K: the spring constant of the mold clamp mechanism;
A: a constant; and
x: the stroke of the cam perpendicular to the direction of the cam displacement Z.

Figure 2:
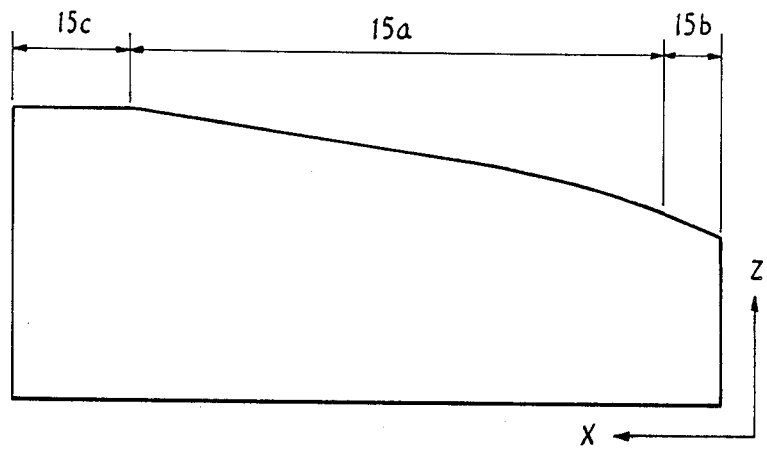
FIG. 2 is an enlarged side elevational view of a cam of the mold clamping device shown in FIG. 1.

FIG. 2 shows a portion of the cam 15 which includes an area 15a defined by a displacement curve expressed by the equation (2), an area 15b defined by a displacement curve expressed by the equation (3), and an area 15c defined by a displacement curve expressed by the equation (4):

$$Z = \sqrt{\frac{2F}{K} x + C} \tag{2}$$

$$Z = ax + b \tag{3}$$
$$Z = d \tag{4}$$

where a, b, c, d are constants.

The equation (2) is obtained by solving the equation (1) on the assumption that the force produced by the air cylinder 17 is constant, the friction of the rollers 14, 16 is negligable, F is constant, and A=0. Where the frictional forces of the rollers 14, 16 are not negligible, the equation (1) may be solved assuming that A is a constant. More specifically, since the equation (1) is of the variable-separation type, $$\frac{1}{\frac{F}{KZ} - A} dZ = dx$$

$$\frac{Z}{\frac{F}{K} - AZ} dZ = dx$$

Integration of this equation results in the following equation:

$$\int \frac{Z}{\frac{F}{K} - AZ} dZ = \int dx + C \tag{5}$$

Assuming that $$F = CZ + B \log \left| \frac{F}{K} - AZ \right|,$$

we get $$F = C + B \frac{-A}{\frac{F}{K} - AZ} = \frac{C\frac{F}{K} - ACZ - AB}{\frac{F}{K} - AZ}$$

By solving $$-AC = 1$$

$$C\frac{F}{K} - AB = 0$$

we get $$C = -\frac{1}{A}$$

$$-\frac{F}{AK} - AB = 0$$

$$B = -\frac{F}{A^2K}$$

Therefore, the equation (5) becomes:

$$-\frac{1}{A}Z - \frac{F}{A^2K}\log\left|\frac{F}{K} - AZ\right| = x + C \quad (6)$$

By selecting coordinates so that Z=0 when x=0, $$-\frac{1}{A}0 - \frac{F}{A^2K}\log\left|\frac{F}{K} - A0\right| = 0 + C \quad (7)$$

$$C = -\frac{F}{A^2K}\log\left|\frac{F}{K}\right|$$

By substituting C in the equation (7) for C in the equation (6), $$-\frac{1}{A}Z - \frac{F}{A^2K}\log\left|\frac{F}{K} - AZ\right| + \frac{F}{A^2K}\log\left|\frac{F}{K}\right| = x \quad (8)$$

$$-\frac{Z}{A} + \frac{F}{A^2K}(\log F - \log K - \log|F - AKZ| + \log K) = x$$

$$-\frac{Z}{A} + \frac{F}{A^2K}\log\frac{F}{F - AKZ} = x$$

Consequently, where the frictional forces are not negligible, the displacement curve expressed by the equation (8) may be used for the cam surface.

The relationship between the cam 15 and the roller cam follower 14 at the time the mold clamping force is generated will be described in detail. The cam 15 starts contacting the roller 14 at the area 15b. As the air cylinder 17 continues to extend its piston rod, the point of contact between the roller 14 and the cam 15 moves from the area 15b into the area 15a, while at the same time the mold clamping force is progressively increased. Since the gradient of the cam area 15a is reduced as the cam stroke x is increased, i.e., as the mold clamping force is increased, the cam 15 can be driven by a constant force. When the point of contact arrives at the cam area 15c, the mold clamping force reaches a required level.

With the arrangement of the embodiment shown in FIG. 1, the mold clamp mechanism, especially the cam 15, is of a relatively small height, so that the overall mold clamping device may be smaller in size. As the mold clamp mechanism may be of an increased degree of rigidity, the required mold clamping force can be produced by a small cam driving force. The amount of energy consumed to clamp the molds together can be reduced by selecting the displacement curve of the cam 15 so as to meet variations in the mold clamping force.

Figure 3:
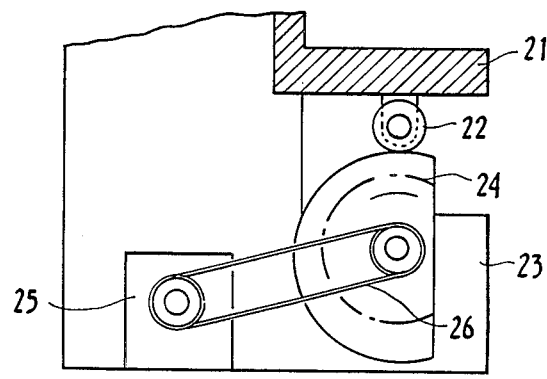
FIG. 3 is a fragmentary side elevational view, partly in cross section, of a mold clamping device according to another embodiment of the present invention.

FIG. 3 shows a mold clamping device according to another embodiment of the present invention. A movable base 21 is vertically movably supported on a frame 23. A cam follower 22 comprising a roller is rotatably mounted on the movable base 21 and held in rolling engagement a cam 24 rotatably supported on the frame 23. The cam 24 has a cam surface equal to the cam surface of FIG. 2 as it extends around the outer circumference of a circle (indicated by the dot-and-dash line in FIG. 3. The cam 24 is driven by a gearmotor 25 through an endless chain 26. After the movable base 21 is moved upwardly to bring the movable mold (not shown) into contact with the fixed mold, the cam 24 is rotated by the gearmotor 25 to push the roller 22 upwardly. The mold clamp mechanism is slightly deformed elastically to clamp the molds under a desired mold clamping force.

The molds can be unclamped by reversing the rotation of the gearmotor 25. Since the cam 24 is directly supported on the frame 23 and driven by the gearmotor 25 through the endless chain 26, the areas through which the cam 24 is in direct contact with these components are reduced, and hence the mold clamp mechanism can be greater in rigidity. Therefore, the desired mold clamping force can be produced by a smaller cam driving force.

The frame 9 shown in FIG. 1 is of a generally C-shaped vertical structure. However, the frame 9 may be composed of a plurality of tie bars and fixed support members, or may be of a horizontal structure.

Figure 4:
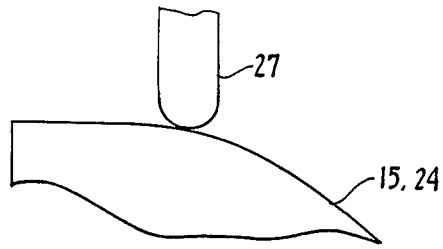
FIG. 4 is a fragmentary side elevational view of a modified cam follower.
Figure 6:
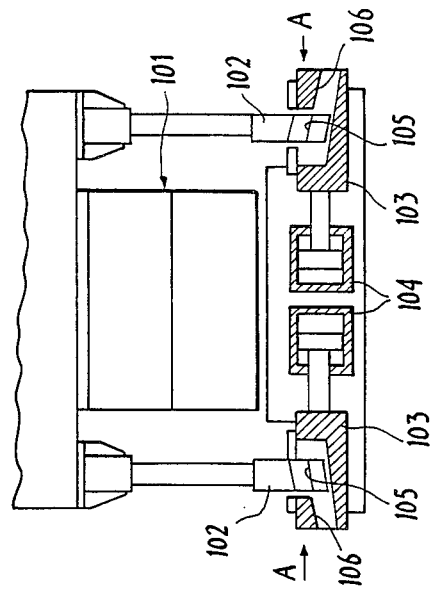
FIG. 6 is a side elevational view, partly in cross section, of another conventional mold clamping device.
Figure 5:
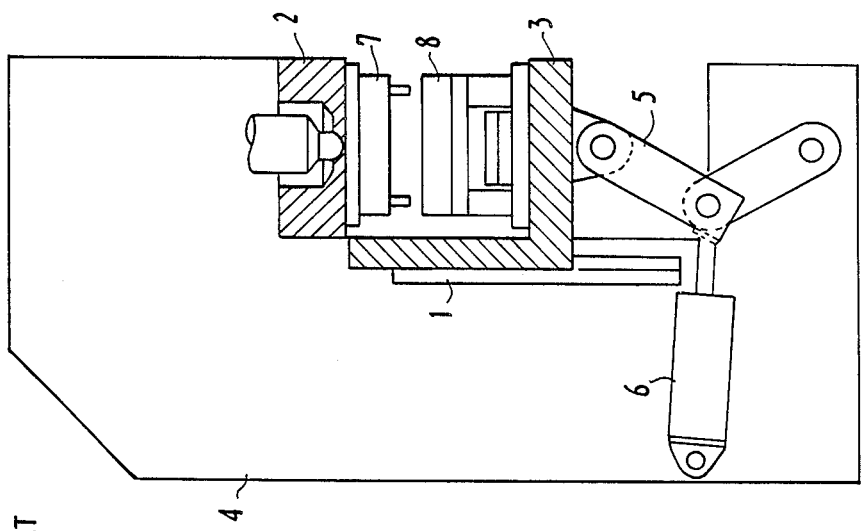
FIG. 5 is a side elevational view, partly in cross section, of a conventional mold clamping device.

The cam follower coacting with the cam 15 or 24 may comprise a rod-shaped slidable member 27 (FIG. 4) having a round end held in sliding engagement with the cam 15 or 24.

Although certain preferred embodiments of the present invention have been shown and described in detail, it should be understood that various changes and modifications may be made therein without departing from the scope of the appended claims.

We claim:

1. A mold clamping device comprising:
   a frame;
   a fixed base for supporting a first mold, said fixed base being fixedly mounted on said frame;
   a movable base for supporting a second mold, said movable base being movably mounted on said frame in opposing relation to said fixed base;
   first means on said frame for driving said movable base to move rectilinearly toward and away from said fixed base to close and open the molds;
   a cam follower supported on said movable base;
   a cam and means for supporting said cam on said frame, said cam having a cam surface held in contact with said cam follower;
   second means for driving said cam in a mold clamping stroke to displace said cam follower for enabling said movable base to clamp the second mold firmly against the first mold on said fixed base, said cam surface being defined by a cam follower displacment curve having a gradient which is greater at an initial stage of said mold clamping stroke and becomes smaller as said mold clamping stroke progresses; and means for actuating said second means to clamp the closed molds;
   said cam and frame and supporting means defining a mold clamp mechanism capable of deforming elastically to clamp the molds as said cam follower moves along the cam surface in the direction of decreasing gradient.

2. A mold clamping device according to claim 1, wherein said cam follower comprises a rotatable roller rotatably held against said cam surface.

3. A mold clamping device according to claim 1, wherein said cam follower comprises a slidable member slidably held against said cam surface.

4. A mold clamping device according to claim 1, wherein said cam surface includes a portion defined by a cam follower displacement curve expressed by:

$$\frac{dZ}{dx} = \frac{F}{KZ} - A$$

where
Z: the displacement of the cam;

F: the force required to drive the cam;
K: the spring constant of the mold clamp mechanism;
A: a constant; and
x: the stroke of the cam perpendicular to the direction of the cam displacement Z.

5. A mold clamping device according to claim 4, wherein said cam is movable rectilinearly in one direction.

6. A mold clamping device according to claim 4, wherein said cam surface includes a portion defined by a cam follower displacement curve expressed by:

$$Z = \sqrt{\frac{2F}{K} x + C}$$

where C is a constant.

7. A mold clamping device according to claim 4, wherein said cam is rotatable about a fixed point.

8. A mold clamping device according to claim 4, wherein said cam surface includes a portion defined by a cam follower displacement curve expressed by:

$$-\frac{1}{A} Z - \frac{F}{A^2 K} \log \left| \frac{F}{K} - AZ \right| = x + C$$

where C is a constant.

9. A mold clamping device comprising:
a frame;
a fixed base of supporting a first mold, said fixed base being fixedly mounted on said frame;
a movable base for supporting a second mold, said movable base being movably mounted on said frame in confronting relation to said fixed base;
first means on said frame for driving said movable base to move rectilinearly toward and away from said fixed base;
a cam follower supported on said movable base;
a cam and means for supporting said cam on said frame, said cam having a cam surface held in contact with said cam follower;
second means for driving said cam in a mold clamping stroke to displace said cam follower for enabling said movable base to clamp the second mold firmly against the first mold on said fixed base, said cam surface being defined by a cam follower displacement curve having a gradient which is greater at an initial stage of said mold clamping stroke and becomes smaller as said mold clamping stroke progresses;
said cam surface including a portion defined by a cam follower displacement curve expressed by:

$$\frac{dZ}{dx} = \frac{F}{KZ} - A$$

where
Z: the displacement of the cam;
F: the force required to drive the cam;
the spring constant of the mold clamp mechanism;
A: a constant; and
x: the stroke of the cam perpendicular to the direction of the cam displacement Z; and said cam surface including a portion defined by a cam follower displacement curve expressed by:

$$Z = \sqrt{\frac{2F}{K} x + C}$$

where C is a constant,
said cam and frame and supporting meand defining a mold clamp mechanism capable of deforming elastically to clamp the molds as said cam follower moves along the cam surface in the direction of decreasing gradient.

10. A mold clamping device according to claim 9, wherein said cam follower comprises a rotatable roller rotatably held against said cam surface.

11. A mold clamping device according to claim 9, wherein said cam follower comprises a slidable member slidably held against said cam surface.

12. A mold clamping device according to claim 9, wherein said cam is movable rectilinearly in one direction.

13. A mold clamping device according to claim 9, wherein said cam is rotatable about a fixed point.

14. A mold clamping device comprising:
a frame;
a fixed base for supporting a first mold, said fixed base being fixedly mounted on said frame;
a movable base for supporting a second mold, said movable base being movably mounted on said frame in confronting relation to said fixed base;
first means on said frame for driving said movable base to move rectilinearly toward and away from said fixed base;
a cam follower supported on said movable base;
a cam and means for supporting said cam on said frame, said cam having a cam surface held in contact with said cam follower;
second means for driving said cam in a mold clamping stroke to displace said cam follower for enabling said movable base to clamp the second mold firmly against the first mold on said fixed base, said cam surface being defined by a cam follower displacment curve having a gradient which is greater at an initial stage of said mold clamping stroke and becomes smaller as said mold clamping stroke progresses;
said cam surface including a portion defined by a cam follower displacement curve expressed by:

$$\frac{dZ}{dx} = \frac{F}{KZ} - A$$

where
Z: the displacement of the cam;
F: the force required to drive the cam;
K: the spring constant of the mold clamp mechanism;
A: a constant; and
x: the stroke of the cam perpendicular to the direction of the cam perpendicular to the direction of the cam displacement Z; and said cam surface including a portion defined by a cam follower displacment curve expressed by:

$$-\frac{1}{A} Z - \frac{F}{A^2 K} \log \left| \frac{F}{K} - AZ \right| = x + C$$

where C is a constant, said cam and frame and supporting means defining a mold clamp mechanism capable of deforming elastically to clamp the molds as said cam follower moves along the cam surface in the direction of decreasing gradient.

15. A mold clamping device according to claim 14, wherein said cam follower comprises a rotatable roller rotatably held against said cam surface.

16. A mold clamping device according to claim 14, wherein said cam follower comprises a slidable member slidably held against said cam surface.

17. A mold clamping device according to claim 14, wherein said cam is movable rectilinearly in one direction.

18. A mold clamping device according to claim 14, wherein said cam is rotatable about a fixed point.

* * * * *